No. 676,016. Patented June 11, 1901.
W. O. WEBBER.
SEPARATOR FOR HYDRAULIC AIR COMPRESSORS.
(Application filed Aug. 29, 1900.)
(No Model.)

WITNESSES:
INVENTOR.

UNITED STATES PATENT OFFICE.

WILLIAM O. WEBBER, OF BOSTON, MASSACHUSETTS, ASSIGNOR TO WALTER C. CARR, OF NEW YORK, N. Y.

SEPARATOR FOR HYDRAULIC AIR-COMPRESSORS.

SPECIFICATION forming part of Letters Patent No. 676,016, dated June 11, 1901.

Application filed August 29, 1900. Serial No. 28,484. (No model.)

*To all whom it may concern:*

Be it known that I, WILLIAM OLIVER WEBBER, of the city of Boston, county of Suffolk, and State of Massachusetts, have invented certain new and useful Improvements in Separators for Hydraulic Air-Compressors; and I hereby declare that the following is a clear, full, and exact description of the same.

This invention relates to improvements in the separating of the compressed air from the entrained water in hydraulic air-compressing apparatus; and it consists in improvements in the form and arrangement of the lower end of the downflow-pipe of such apparatus and its location in the separating-chamber.

Figure 1:
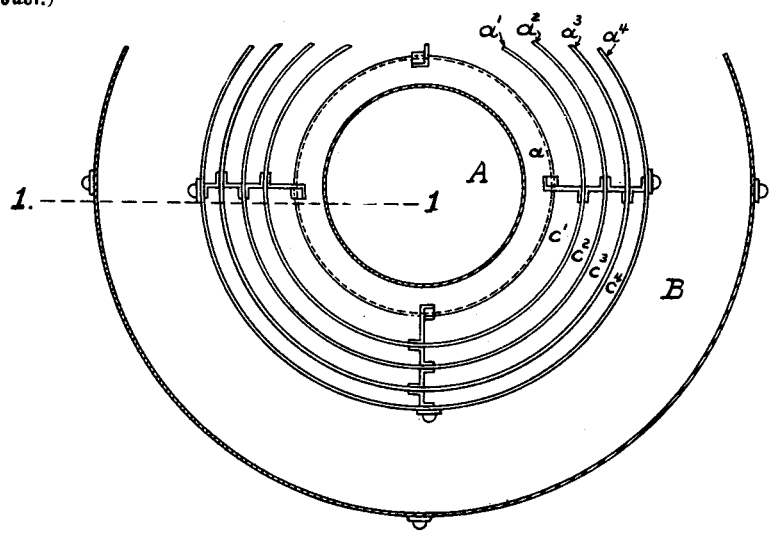
Figure 2:
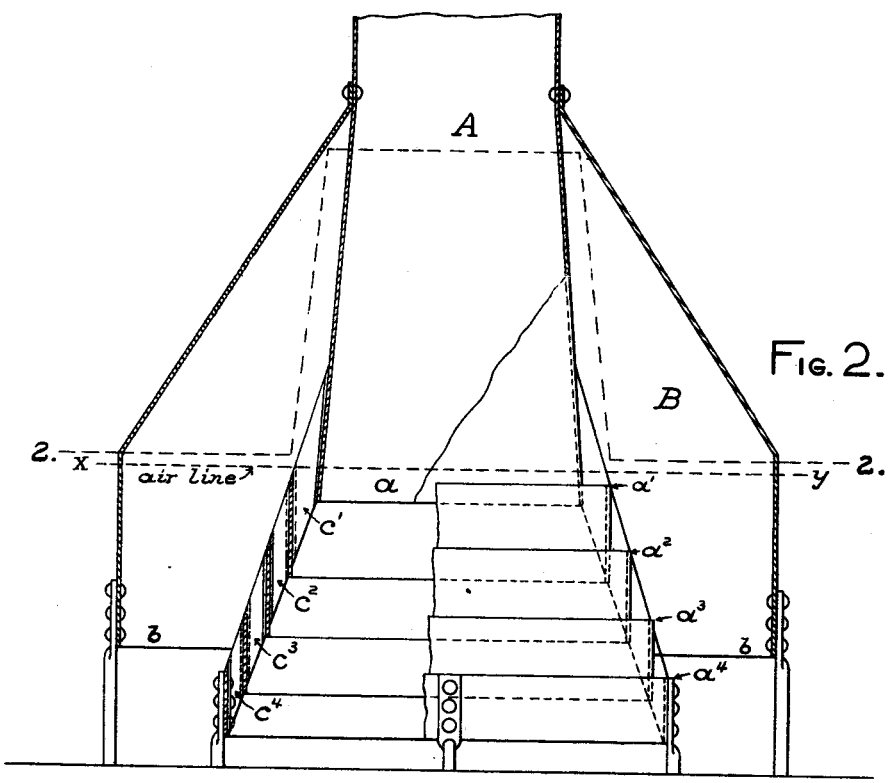

Figure 1 is a horizontal section on the line 2 2 of Fig. 2. Fig. 2 is a partial vertical section on the line 1 1 of Fig. 1 and partial elevation of the lower part of the downflow-tube and the adjacent separating-plates.

Line $x\,y$ in Fig. 2 is an imaginary air-line or line of separation between the escaping compressed air and water in the inverted vessel B.

Reference is had to the accompanying drawings, forming part of this specification, in which similar characters represent the corresponding parts in both views.

The object of this invention is to provide a means by which the compressed air entrained by and carried down by the descending column of water in the main downflow-pipe is easily, readily, and thoroughly caused to separate itself from the water and rise as quickly and as readily as may be possible into the top of an inverted vessel whose lower end is open to prevent the easy escape of the water and to cause this separation of the air and water to be as complete and expeditious as may be possible and at the same time provide an apparatus which will accomplish these results which is compact and which will require the least amount of space both in horizontal area and also in vertical height.

A is the lower end of the main downflow-pipe, the extreme lower end of which is expanded at a small taper not exceeding five degrees to its extreme lower end $a$. Surrounding this enlarged lower end of the main downflow-pipe A are concentric vertically-disposed separating-plates $a'$, $a^2$, $a^3$, and $a^4$. The diameters of the circles on which these plates are bent are such that the annular spaces inclosed between each succeeding ring have the same or proportionately-decreasing areas and each less than that of the downflow-pipe. (This described a circular form of construction; but it is obvious that in a rectangular or other form of construction these proportions can be maintained.) The upper edge of each plate is made to project above the lower edge of the next smaller plate, which it surrounds, so as to give the current of water and air passing between any two of these plates or the lower edge of the downflow-pipe and the inner plate an upward direction. Surrounding the lower end of the downflow-pipe and the separating-plates just described is an inverted conical vessel or chamber B, the upper or conical part thereof forming an air-chamber in which the air escaping from the water is accumulated. The lower edge $b$ of this inverted vessel B does not project downward as far as the lower edge of the outer separating plate or ring $a^4$ in order to allow ample space below its edge for all of the water passing down through the main downflow-pipe A to pass out under this lower edge $b$ of the inverted vessel B at an exceedingly-low velocity.

The action of this apparatus is as follows: Falling water, having entrained with it a large amount of air, is entered into the upper end of the vertical downflow-pipe A. As this water and air descend the air is compressed by the weight of the column of water upon it and the bubbles of air become smaller and smaller as the pressure upon them is increased. After passing the upper end of the tapering portion of the downflow-pipe A a separation of the air and water commences, owing to the increased area. As the combined air and water column passes downward the air accumulates at the outer circumference of the descending water column and in juxtaposition to the inner periphery of the conical sides of the tapering tube. Upon arriving at the lower edge $a$ of this tapering tube a portion of the combined air and water attempts to make its escape upward through the passage $c'$ between the lower edge of the main downflow-pipe A and the inside of the surrounding separating-plate $a'$, carrying with it a large proportion of the air which has accumulated at the periphery of the descending water column. This air and water after passing out over the upper edge of the separating plate or ring $a'$ flows outwardly to the inner periphery of the inverted vessel B, and in so doing the entrained air has a constantly-increasing chance of escaping upward into the upper part of this chamber or vessel B as the velocity of flow decreases. The water after separating from the air passes downward along the inner periphery of the inverted vessel B, finally passing out under the lower edge $b$ of this vessel, seeking again the level of the top of the downflow-column. As, however, the area of the passage $c'$ is not as great as the area of the passage A only part of the combined air and water column descending though the pipe A can pass through the passage $c'$. Therefore a further portion of the combined air and water must pass up through the passage $c^2$ between the separating plates or rings $a'$ and $a^2$, and a further portion of the combined air and water passes up through the passage $c^3$ and $c^4$. As, however, the lower edges of these separating-plates $a'$, $a^2$, $a^3$, and $a^4$ form a shorter cone of still more rapidly increasing area than the taper of the lower end of the downflow-pipe A it is obvious that more and more of the air will be forced outward to the inner periphery of these separating-plates and the more readily escape through the passages between them, owing to the air-bubbles uniting and forming larger bubbles of greater buoyancy. It is, however, obvious that the largest per cent. of the total amount of entrained air will pass upward through the passage $c'$ and in constantly-decreasing proportion through the next outwardly-surrounding passages. It is obvious that the accumulation of the air-bubbles at the inner peripheries of the surrounding separating-plates causes them to ascend with greater buoyancy and much more rapidly than if they were evenly distributed through the whole area of the water column, and it is also obvious that in giving the bubbles of air an upward direction immediately upon escaping under the edges of the separating-plates $a'$, $a^2$, $a^3$, and $a^4$ a still further upward impetus is given to these air-bubbles, causing them to rise much more rapidly and accumulate faster in the upper portion of the inverted vessel B.

Having now described and explained the operation of this invention, what I desire to claim and secure by Letters Patent is as follows:

1. In the separator of a hydraulic air-compressing apparatus, the lower end of the downflow-pipe surrounded by one or more vertically-disposed separating-plates, substantially as described.

2. In the separator of a hydraulic air-compressing apparatus, a downflow-pipe having an enlarged lower end surrounded by one or more vertically-disposed separating-plates, substantially as described.

3. In the separator of a hydraulic air-compressing apparatus, the lower end of the downflow-pipe surrounded by one or more vertically-disposed separating-plates, the space between each succeeding separating-plate and the previous one being of less area than that of the downflow-pipe, substantially as described.

4. In the separator of a hydraulic air-compressing apparatus, the lower end of the downflow-pipe surrounded by one or more vertically-disposed separating-plates, the spaces between the plates being of proportionately-decreasing areas, substantially as described.

5. In the separator of a hydraulic air-compressing apparatus, a downflow-pipe having an enlarged lower end surrounded by one or more vertically-disposed separating-plates, the space between each succeeding plate and the previous one being of less area than that of the downflow-pipe, substantially as described.

6. In the separator of a hydraulic air-compressing apparatus, a downflow-pipe having an enlarged lower end surrounded by one or more vertically-disposed separating-plates, the spaces between the plates being of proportionately-decreasing areas, substantially as described.

7. In the separator of a hydraulic air-compressing apparatus, the lower end of the downflow-pipe surrounded by one or more vertically-disposed separating-plates, the upper edge of each succeeding separating-plate of larger inclosed area projecting above the lower edge of the next smaller plate it surrounds, substantially as described.

8. In the separator of a hydraulic air-compressing apparatus, a downflow-pipe having an enlarged lower end surrounded by one or more vertically-disposed separating-plates, the upper edge of each succeeding separating-plate of larger inclosed area, projecting above the lower edge of the next smaller plate which it surrounds, substantially as described.

9. In the separator of a hydraulic air-compressing apparatus, the lower end of the downflow-pipe surrounded by one or more vertically-disposed separating-plates, the space between each succeeding separating-plate and the previous one being of less area than that of the downflow-pipe, and the upper edge of each succeeding separating-plate projecting above the lower edge of the next smaller plate which it surrounds, substantially as described.

10. In the separator of a hydraulic air-compressing apparatus, the lower end of the downflow-pipe surrounded by one or more vertically-disposed separating-plates, the spaces between the plates being of proportionately-decreasing areas, and the upper edge of each succeeding separating-plate projecting above the lower edge of the next smaller plate which it surrounds, substantially as described.

11. In the separator of a hydraulic air-compressing apparatus, a downflow-pipe having an enlarged lower end surrounded by one or more vertically-disposed separating-plates, the space between each succeeding plate and the previous one being of less area than that of the downflow-pipe, and the upper edge of each succeeding separating-plate projecting above the lower edge of the next smaller plate which it surrounds, substantially as described.

12. In the separator of a hydraulic air-compressing apparatus, a downflow-pipe having an enlarged lower end surrounded by one or more vertically-disposed separating-plates, the spaces between the plates being of proportionately-decreasing areas, each less than that of the downflow-pipe, and the upper edge of each succeeding separating-plate of larger inclosed area, projecting above the lower edge of the next smaller plate which it surrounds, substantially as described.

13. In the separator of a hydraulic air-compressing apparatus, a downflow-pipe having an enlarged lower end surrounded by one or more vertically-disposed separating-plates, the spaces between the plates being of proportionately-decreasing areas, each less than that of the downflow-pipe, the upper edge of each succeeding separating-plate projecting above the lower edge of the next smaller plate which it surrounds, and the lower end of the downflow-pipe and its surrounding plates projecting vertically downward into an inverted vessel having its lower end open, substantially as described.

14. In the separator of a hydraulic air-compressing apparatus, a downflow-pipe having an enlarged lower end surrounded by one or more vertically-disposed separating-plates, the spaces between the plates being of proportionately-decreasing areas, the upper edge of each succeeding separating-plate of larger inclosed area projecting above the lower edge of the next smaller plate which it surrounds, the lower end of the downflow-pipe and its surrounding plates projecting vertically downward into an inclosed inverted vessel having its lower end open, the upper part of this vessel forming an air-chamber.

In testimony whereof I have hereunto affixed my signature in the presence of two subscribing witnesses.

WILLIAM O. WEBBER.

Witnesses:
BENJAMIN KIMBALL,
CHAS. M. W. SMITH.